(12) United States Patent
Farley (10) Patent No.: US 12,239,097 B2
(45) Date of Patent: Mar. 4, 2025

(54) CAT TOWER ASSEMBLY

(71) Applicant: Sean S. Farley, Camarillo, CA (US)

(72) Inventor: Sean S. Farley, Camarillo, CA (US)

( * ) Notice: Subject to any disclaimer, the term of this patent is extended or adjusted under 35 U.S.C. 154(b) by 0 days.

(21) Appl. No.: 18/203,896

(22) Filed: May 31, 2023

(65) Prior Publication Data

US 2023/0389512 A1 Dec. 7, 2023

Related U.S. Application Data

(60) Provisional application No. 63/365,779, filed on Jun. 2, 2022.

(51) Int. Cl.
*A01K 1/035* (2006.01)
*F16B 9/02* (2006.01)

(52) U.S. Cl.
CPC .............. *A01K 1/035* (2013.01); *F16B 9/02* (2013.01)

(58) Field of Classification Search
CPC .......... A01K 1/035; A01K 1/033; A01K 1/03; A01K 15/04; A63H 33/04; A63H 33/044
See application file for complete search history.

(56) References Cited

U.S. PATENT DOCUMENTS

| | | | | |
|---|---|---|---|---|
| D261,186 S | * | 10/1981 | Michalski | D30/158 |
| 6,378,463 B1 | * | 4/2002 | Simmons | A01K 15/024 |
| | | | | 119/707 |
| 8,020,518 B1 | * | 9/2011 | Reinke | A01K 15/025 |
| | | | | 119/482 |
| D774,708 S | * | 12/2016 | Kellogg | D30/160 |
| D883,585 S | * | 5/2020 | Song | D30/160 |
| 2011/0253060 A1 | * | 10/2011 | Schotthoefer | A01K 15/024 |
| | | | | 119/706 |
| 2012/0312239 A1 | * | 12/2012 | Wedertz | A01K 15/024 |
| | | | | 119/28.5 |
| 2014/0033987 A1 | * | 2/2014 | Hoffman | A01K 1/035 |
| | | | | 119/706 |
| 2018/0199538 A1 | * | 7/2018 | Amicarelli | A01K 1/0107 |
| 2019/0230896 A1 | * | 8/2019 | Goldman | A01K 1/035 |

FOREIGN PATENT DOCUMENTS

| | | | | |
|---|---|---|---|---|
| DE | 3802126 A | * | 8/1989 | A63H 33/04 |
| DE | 20001069 U1 | * | 6/2000 | A01K 15/024 |

OTHER PUBLICATIONS

DE3802126 (Year: 1989).*

* cited by examiner

*Primary Examiner* — Kristen C Hayes
(74) *Attorney, Agent, or Firm* — Orbit IP, LLP; Marc G. Martino (57) ABSTRACT

A self-supporting structure for the play and relaxation of cats is disclosed. A first, second and third cylindrical tower define respectively a first, second and third length from a first, second and third bottom end opposite a first, second and third top end. A flat triangular base defines a bottom side opposite a top side. The flat triangular base is configured to be attachable at each of its triangular ends respectively to the first bottom end, the second bottom end and the third bottom end of the cylindrical towers. A second diameter and a third diameter of their respective cylindrical towers are each less than a first diameter of the first cylindrical tower. The second length added to the third length is less than the first length. The second and third cylindrical tower are configured to be disposed inside the first cylindrical tower during shipping.

23 Claims, 11 Drawing Sheets

CAT TOWER ASSEMBLY

CROSS-REFERENCE TO RELATED APPLICATIONS

This application claims priority to provisional application 63/365,779 filed on Jun. 2, 2022, the entire contents of which are fully incorporated herein with these references.

DESCRIPTION

Field of the Invention

The present invention generally relates to products for cats. More particularly, the present invention relates to a cat tower assembly that can be shipped in a small package and thereafter assembled into a much larger three-tower assembly.

Background of the Invention

The pet industry is a huge business, with new products constantly being offered in the marketplace. Furthermore, cats enjoy climbing and lounging in structures that are higher than the floor level, as this creates a place of safety and comfort for them. Accordingly, there is a need for new structures that are easy to install for one's pet cat and can attach to a variety of vertical surfaces commonly found. The present invention fulfills these needs and provides other related advantages.

SUMMARY OF THE INVENTION

An exemplary embodiment of the self-supporting structure 10 for the play and relaxation of cats, includes the following: a first cylindrical tower 11a defining a first length 12a from a first bottom end 13a opposite a first top end 14a, the first cylindrical tower having a first diameter 15a; a second cylindrical tower 11b defining a second length 12b from a second bottom end 13b opposite a second top end 14b, the second cylindrical tower having a second diameter 15b; a third cylindrical tower 11c defining a third length 12c from a third bottom end 13c opposite a third top end 14c, the third cylindrical tower having a third diameter 15c; a flat triangular base 20 defining a bottom side 21 opposite a top side 22, wherein the bottom side is configured to face downwards and the top side is configured to face upwards; wherein the flat triangular base is configured to be attachable at each of its triangular ends 23a, 23b, 23c respectively to the first bottom end, the second bottom end and the third bottom end of the cylindrical towers; wherein the second diameter and the third diameter are each less than the first diameter; wherein the second length added to the third length is less than the first length; and wherein the second cylindrical tower and the third cylindrical tower are configured to be disposed inside the first cylindrical tower during shipping.

In further exemplary embodiments, each cylindrical tower may comprise a tube 27 with a base 28 connected to the bottom end of the tube and a cap 29a connected to the top end of the tube. Each base may be connected to the bottom end of the tube with a bottom interference fit, and each cap may be connected to the top end of the tube with a top interference fit.

For example, the first cylindrical tower may comprise a first tube 27a with a first base 28a connected to the first bottom end of the first tube and a first cap 29a connected to the first top end of the first tube. Likewise, the second cylindrical tower may comprise a second tube 27b with a second base 28b connected to the second bottom end of the second tube and a second cap 29b connected to the second top end of the second tube. Finally, the third cylindrical tower comprises a third tube 27c with a third base 28c connected to the third bottom end of the third tube and a third cap 29c connected to the third top end of the third tube.

The first base may be connected to the first bottom end of the first tube with a first bottom interference fit, and the first cap may be connected to the first top end of the first tube with a first top interference fit. The second base may be connected to the second bottom end of the second tube with a second bottom interference fit, and the second cap may be connected to the second top end of the second tube with a second top interference fit. wherein the third base is connected to the third bottom end of the third tube with a third bottom interference fit, and wherein the third cap is connected to the third top end of the third tube with a third top interference fit.

In an alternative embodiment, the second length may be equal to the third length while the addition of the second and third lengths are still less than the first length.

In another embodiment, the third diameter may be less than the second diameter, the third length may be less than the second length, and the third cylindrical tower may be configured to be disposed inside of the second cylindrical tower during shipping.

The flat triangular base may be composed of three identically shaped portions 24i, 24ii, 24iii which are attachable to one another. The three identically shaped portions are disposed adjacent to one another and are attachable to one another by a plurality of brackets 25. The three identically shaped portions are each shaped as an isosceles trapezoid, meaning two parallel sides (i.e., bases) and a line of symmetry about the legs. The flat triangular base may include a plurality of leveling feet 26 attached to the bottom side of the flat triangular base.

A first sisal wrap 16a may have a first loop-and-hook fastener 17a at its ends, with a first loop portion 18a at one end and a first hook portion 19a at the other end. The first sisal wrap may be configured to wrap around the first diameter and attach to itself using the first hook-and-loop fastener.

Likewise, a second sisal wrap 16b may have a second loop-and-hook fastener 17b at its ends, with a second loop portion 18b at one end and a second hook portion 19b at the other end. The second sisal wrap may be configured to wrap around the second diameter and attach to itself using the second hook-and-loop fastener. Finally, a third sisal wrap 16c may have a third loop-and-hook fastener 17c at its ends, with a third loop portion 18c at one end and a third hook portion 19c at the other end. The third sisal wrap may be configured to wrap around the third diameter and attach to itself using the third hook-and-loop fastener.

Some embodiments may include a resting pad 30 is larger in diameter 31 in comparison to the first diameter and is configured to be removable attached to the first top end. The resting pad may have a large diameter blind hole 32 having a depth 33, where the blind hole is configured to snugly receive the first top end of the first cylindrical tower. The resting pad may include a raised upper rim 34 at least partially disposed around the diameter of the resting pad and a divot 35 that allows the cat access onto the resting pad. In another embodiment not shown, the resting pad could be simplified to a flat plate made from plastic or wood. Accordingly, it could be fastened to a top of a tower and/or replace a cap of a tower.

A first, a second and a third base connector 40a, 40b, 40c have a male side thread 41 connected to a flared end 42. The flared end may have at least one finger grip extension 43 extending outwardly. The base connector may be an injection molded plastic part. Each base of the cylindrical tower may comprise a female side thread 44 configured to accept the male side thread of the base connector.

The flat triangular base may comprise three holes 45 disposed therethrough that are configured to allow the male side thread of the base connector to pass therethrough from the bottom side of the flat triangular base. Each base may be attached to the top side of the flat triangular base by the flared end of the respective base connector disposed on the bottom side of the flat triangular base. A user is configured to manually rotate each base connector without the use of an auxiliary tool thereby securing the respective base of the cylindrical tower to the flat triangular base.

The first, second and third cylindrical towers are generally hollow, but could include other parts for shipping.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 21:
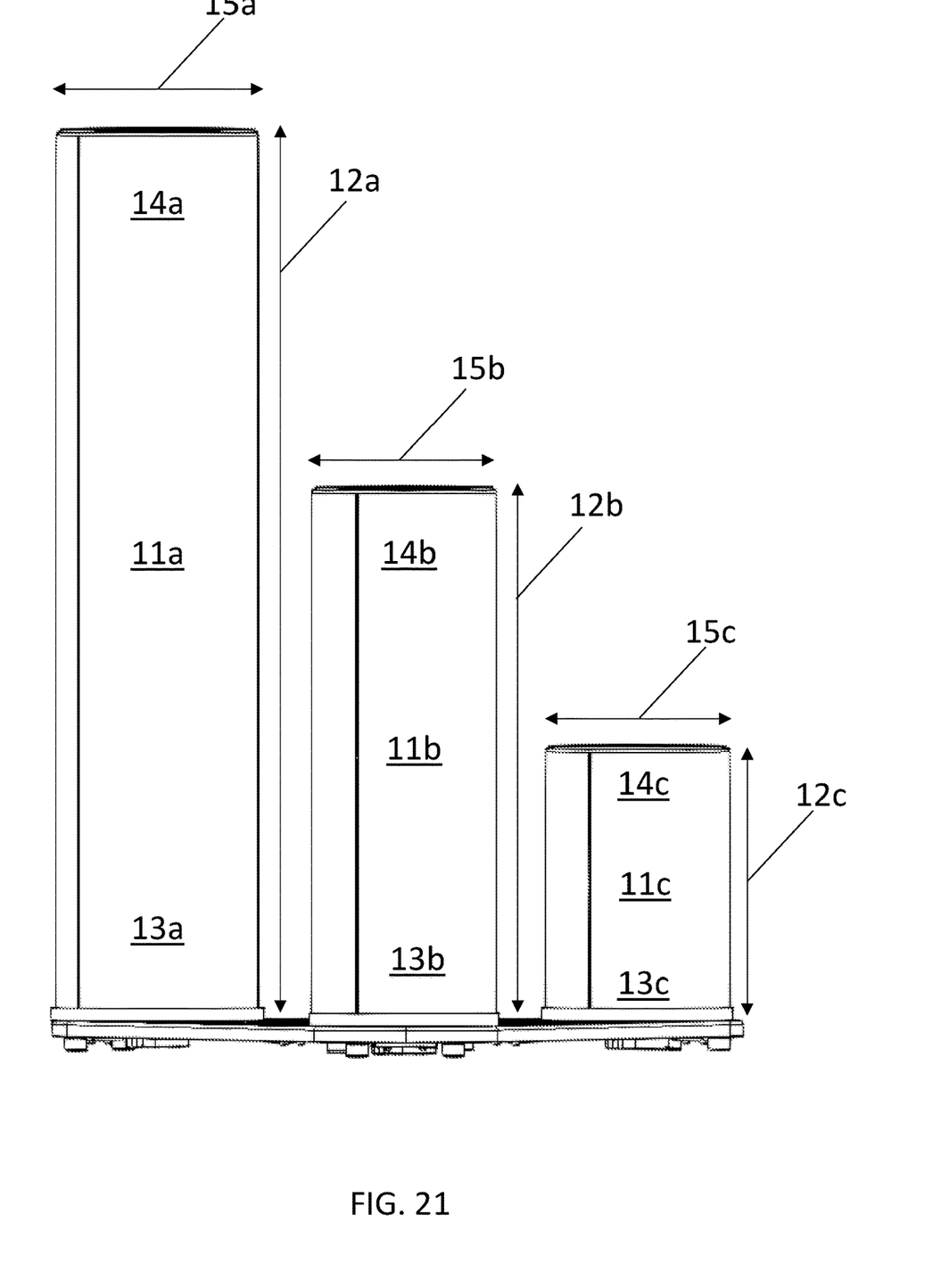
FIG. 21 is a side view of the structure of FIG. 1 now with the resting pad removed.

FIGS. 1-4 are isometric views of an exemplary embodiment of the self-supporting structure 10 for the play and relaxation of cats. Three cylindrical towers 11 are connected to a flat triangular base 20. Referring to FIG. 21, more specifically a first cylindrical tower 11a defines a first length 12a from a first bottom end 13a opposite a first top end 14a. The first cylindrical tower has a first diameter 15a. A second cylindrical tower 11b defines a second length 12b from a second bottom end 13b opposite a second top end 14b. The second cylindrical tower has a second diameter 15b. A third cylindrical tower 11c defines a third length 12c from a third bottom end 13c opposite a third top end 14c. The third cylindrical tower has a third diameter 15c. The second diameter and the third diameter are each less than the first diameter. Furthermore, the second length added to the third length is less than the first length. Accordingly, the second cylindrical tower and the third cylindrical tower are configured to be disposed inside the first cylindrical tower during shipping.

The first, second and third cylindrical towers are generally hollow, but could include other parts for shipping disposed therein.

In an alternative embodiment, the second length may be equal to the third length while the addition of the second and third lengths are still less than the first length.

In another embodiment, the third diameter may be less than the second diameter, the third length may be less than the second length, and the third cylindrical tower may be configured to be disposed inside of the second cylindrical tower during shipping.

Referring back to FIGS. 1-4, a flat triangular base 20 defining a bottom side 21 opposite a top side 22. The bottom side is configured to face downwards (towards the ground) and the top side is configured to face upwards (towards the sky). The flat triangular base is configured to be attachable at each of its triangular ends 23a, 23b, 23c respectively to the first bottom end, the second bottom end and the third bottom end of the cylindrical towers.

Figures 1, 2:
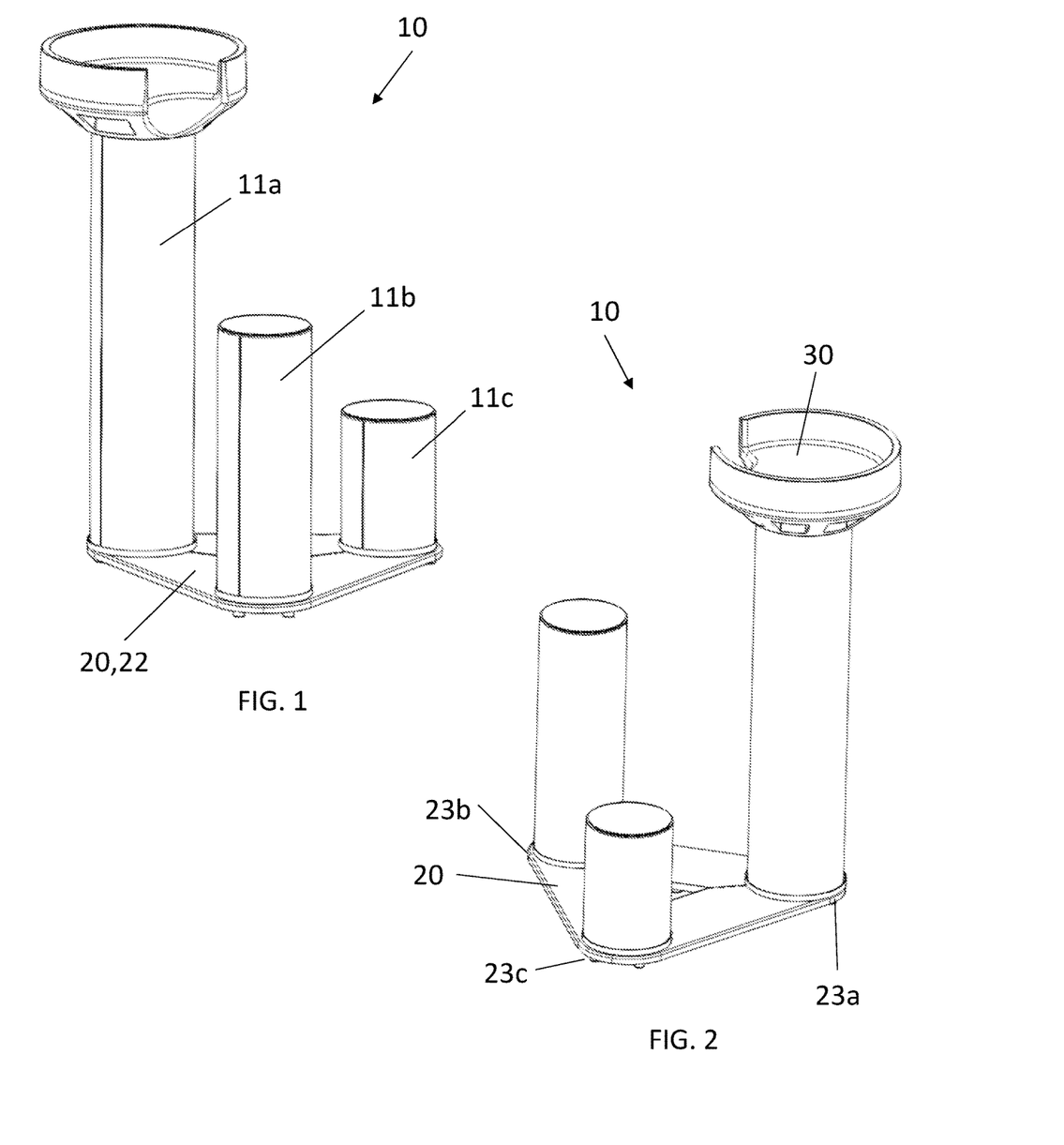
FIG. 1 is an isometric view of an exemplary embodiment of a self-supporting structure for the play and relaxation of cats.
FIG. 2 is another isometric view of the structure of FIG. 1.
Figure 3:
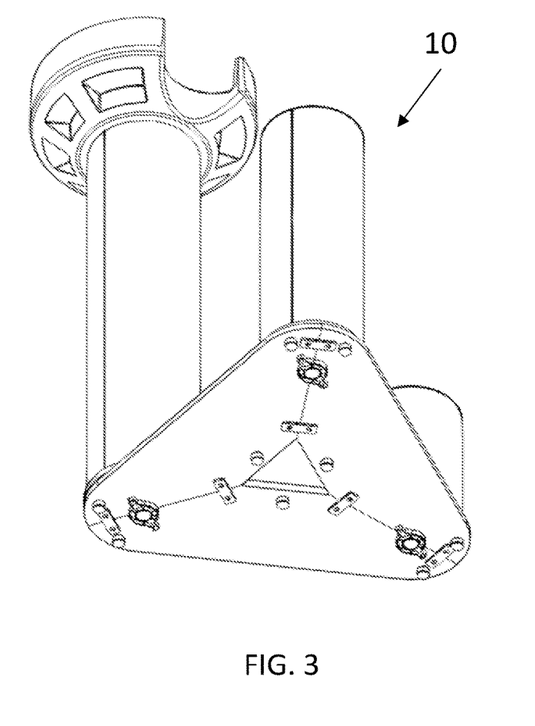
FIG. 3 is another isometric view of the structure of FIG. 1.
Figure 4:
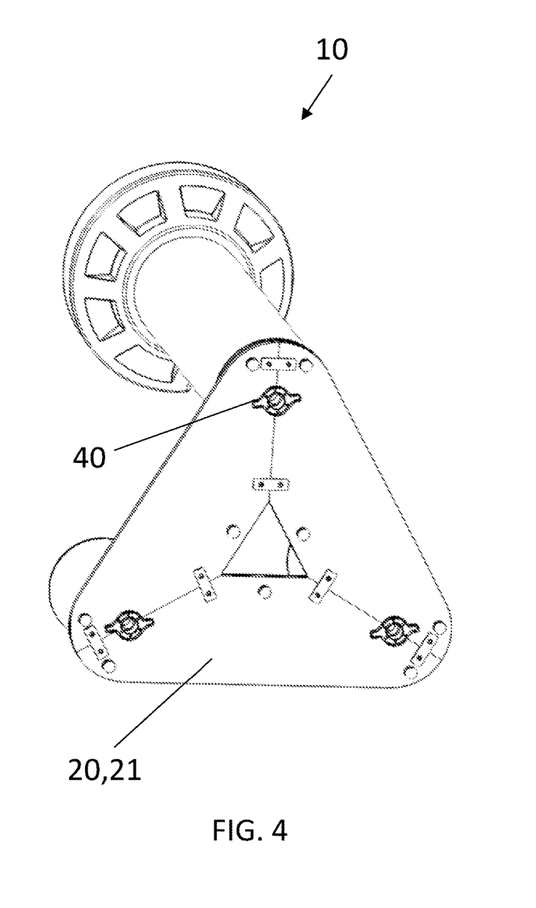
FIG. 4 is another isometric view of the structure of FIG. 1.
Figure 5:
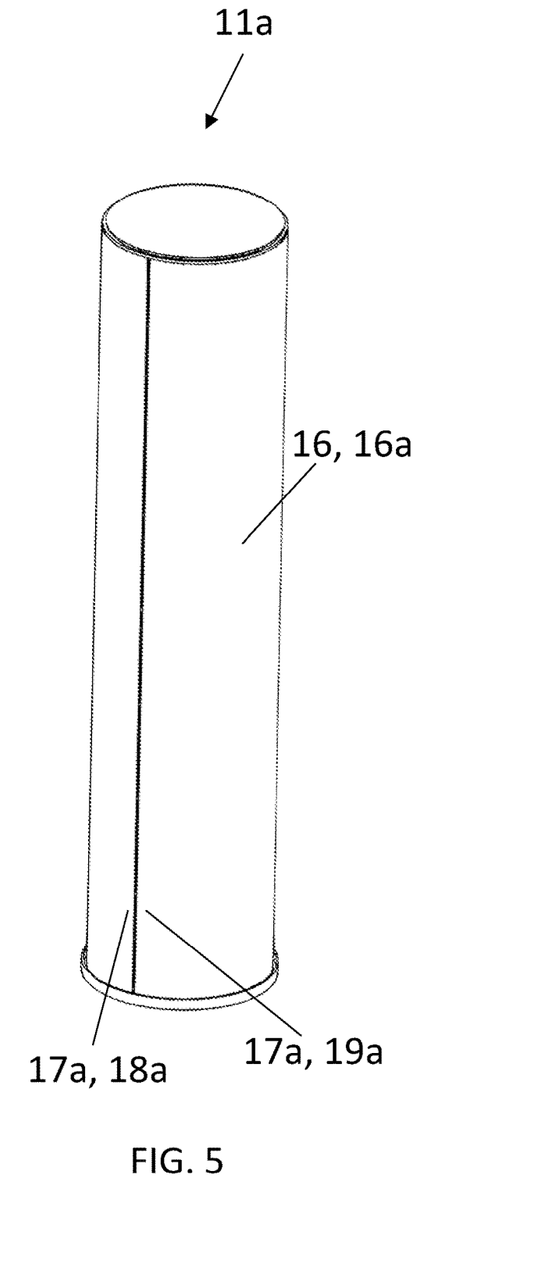
FIG. 5 is an isometric view of the first cylindrical tower from the structure of FIG. 1 having a sisal wrap disposed thereon.

FIG. 5 is an isometric view of the first cylindrical tower from the structure of FIG. 1 having a first sisal wrap 16a disposed thereon. The first sisal wrap 16a has a first loop-and-hook fastener 17a at its ends, with a first loop portion 18a at one end and a first hook portion 19a at the other end. The first sisal wrap is configured to wrap around the first diameter and attach to itself using the first hook-and-loop fastener. It is understood by those skilled in the art that the second and third cylindrical towers could also have their equivalent sisal wrap 16b and 16c disposed thereon.

More specifically, a second sisal wrap 16b may have a second loop-and-hook fastener 17b at its ends, with a second loop portion 18b at one end and a second hook portion 19b at the other end. The second sisal wrap may be configured to wrap around the second diameter and attach to itself using the second hook-and-loop fastener. Finally, a third sisal wrap 16c may have a third loop-and-hook fastener 17c at its ends, with a third loop portion 18c at one end and a third hook portion 19c at the other end. The third sisal wrap may be configured to wrap around the third diameter and attach to itself using the third hook-and-loop fastener.

Figure 6:
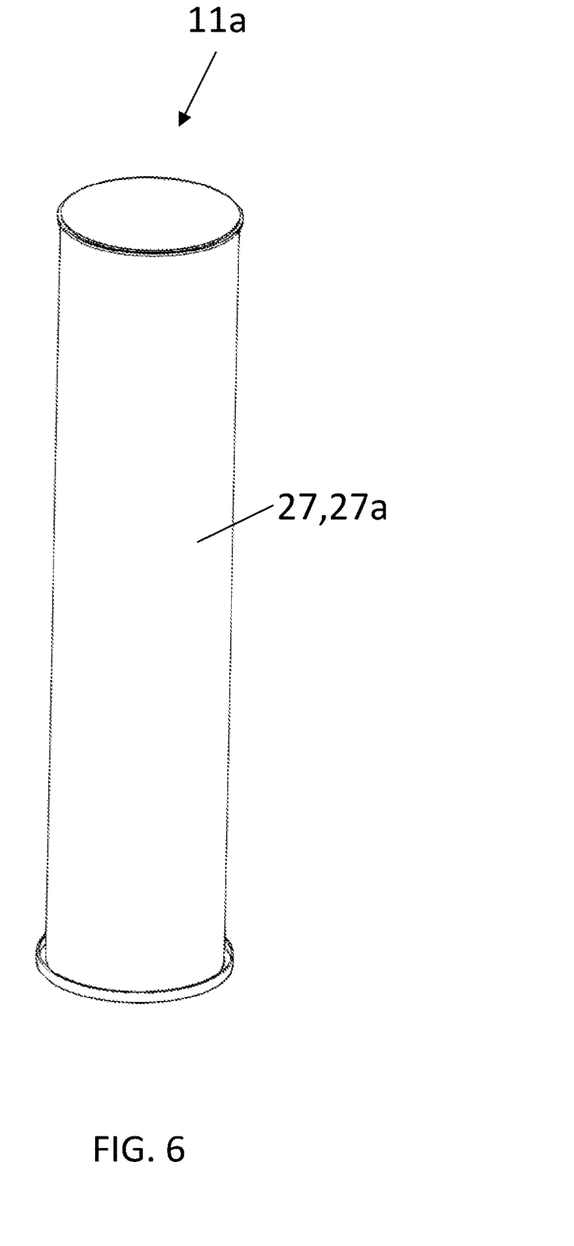
FIG. 6 is the same isometric view of the structure of FIG. 5 now with the sisal wrap removed.

FIG. 6 is the same isometric view of the structure of FIG. 5 now with the sisal wrap removed. Each cylindrical tower may comprise a tube 27. More specifically, the first tower would have tube 27a, the second tower would have tube 27b, and the third tower would have tube 27c. The tubes could be extruded plastic for ease of manufacturing.

Figure 7:
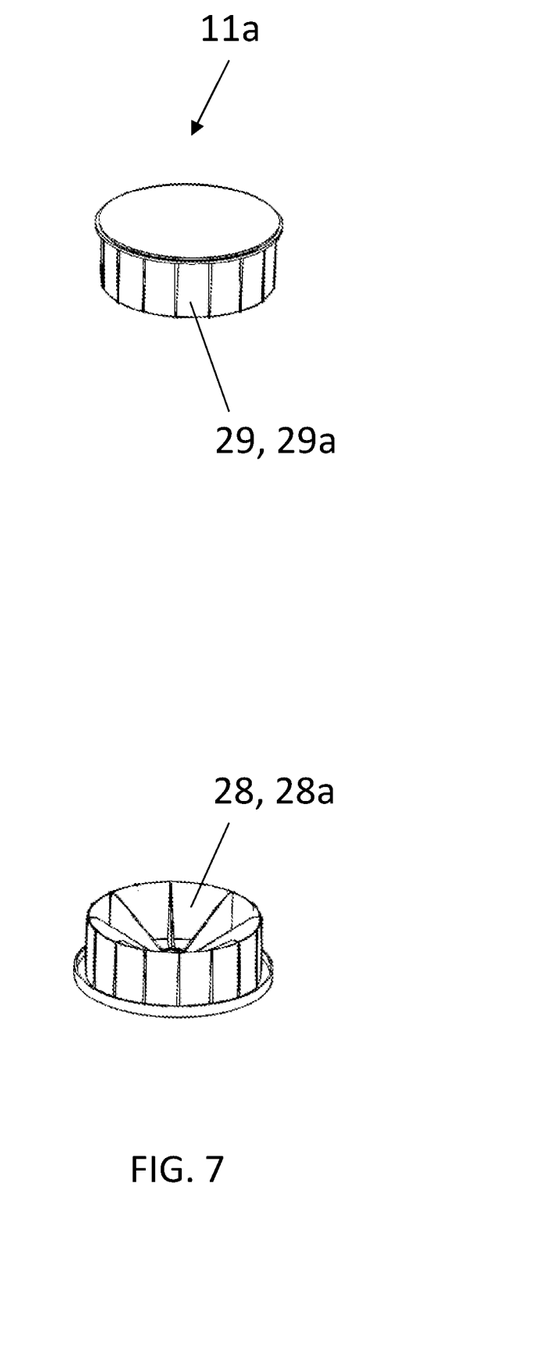
FIG. 7 is the same isometric view of the structure of FIG. 6 now with the tube removed showing the cap and base.

FIG. 7 is the same isometric view of the structure of FIG. 6 now with the tube removed showing a base 28 and a cap 29. It is understood by those skilled in the art that each tube has a base 28 connected to the bottom end of the tube and a cap 29 connected to the top end of the tube. Each base may be connected to the bottom end of the tube with a bottom interference fit, and each cap may be connected to the top end of the tube with a top interference fit.

More specifically, the first cylindrical tower may comprise a first tube 27a with a first base 28a connected to the first bottom end of the first tube and a first cap 29a connected to the first top end of the first tube. Likewise, the second cylindrical tower may comprise a second tube 27b with a second base 28b connected to the second bottom end of the second tube and a second cap 29b connected to the second top end of the second tube. Finally, the third cylindrical tower comprises a third tube 27c with a third base 28c connected to the third bottom end of the third tube and a third cap 29c connected to the third top end of the third tube. The first base may be connected to the first bottom end of the first tube with a first bottom interference fit, and the first cap may be connected to the first top end of the first tube with a first top interference fit. The second base may be connected to the second bottom end of the second tube with a second bottom interference fit, and the second cap may be connected to the second top end of the second tube with a second top interference fit. wherein the third base is connected to the third bottom end of the third tube with a third bottom interference fit, and wherein the third cap is connected to the third top end of the third tube with a third top interference fit.

Figure 9:
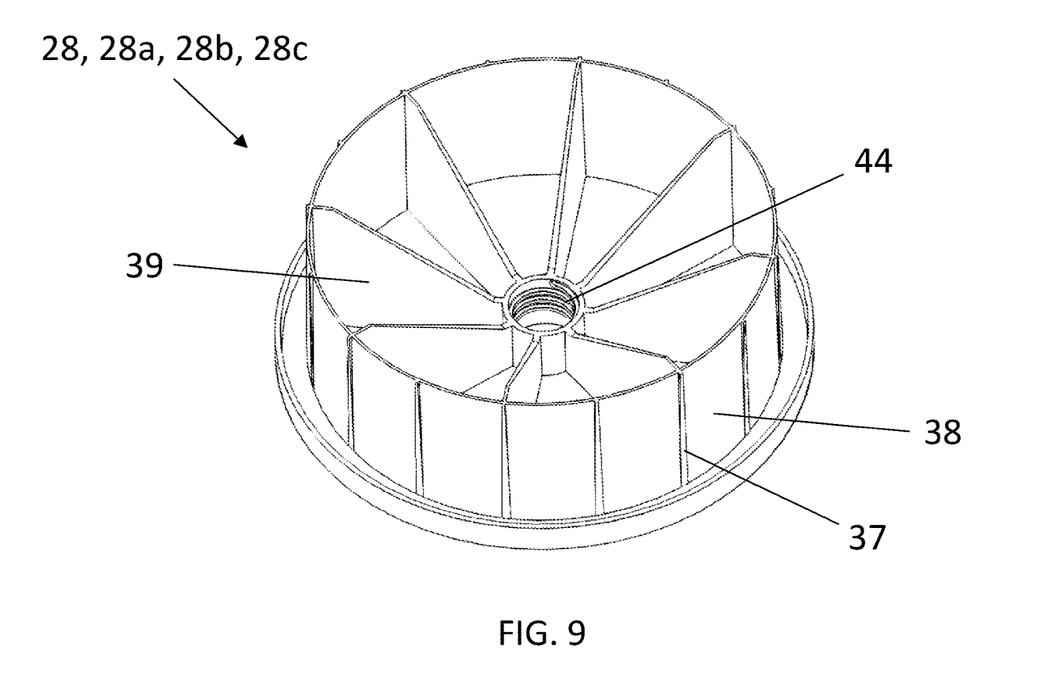
FIG. 9 is an isometric view of the base for each tower of the present invention.
Figure 10:
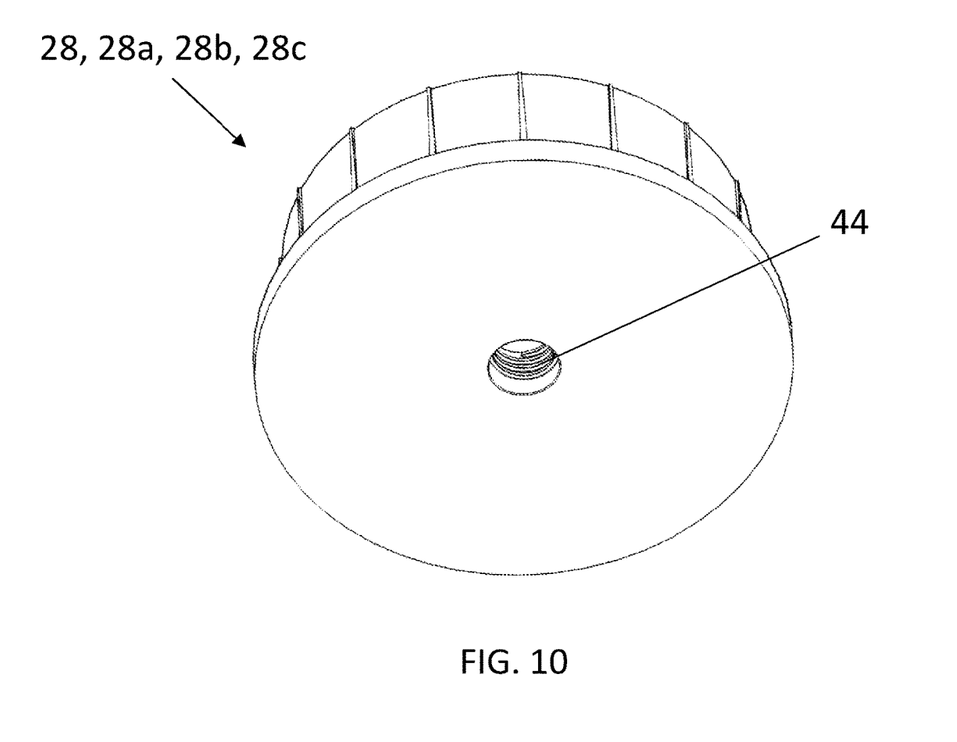
FIG. 10 is another isometric view of the structure of FIG. 9.

FIG. 9 is an isometric view of the base 28 for each cylindrical tower of the present invention and FIG. 10 is another isometric view of the base from below. The base has a plurality of interference features 37 disposed about its rim 38. These interference features are extensions that stick out just a bit and are designed to abut and engage an inside surface of the tubes. Each base of the cylindrical tower may comprise a female side thread 44 configured to accept a male side thread of the base connector as later discussed. A plurality of stiffening ribs 39 are also designed to add strength and rigidity to the overall structure. Each base can be injection molded as a single part.

Figure 11:
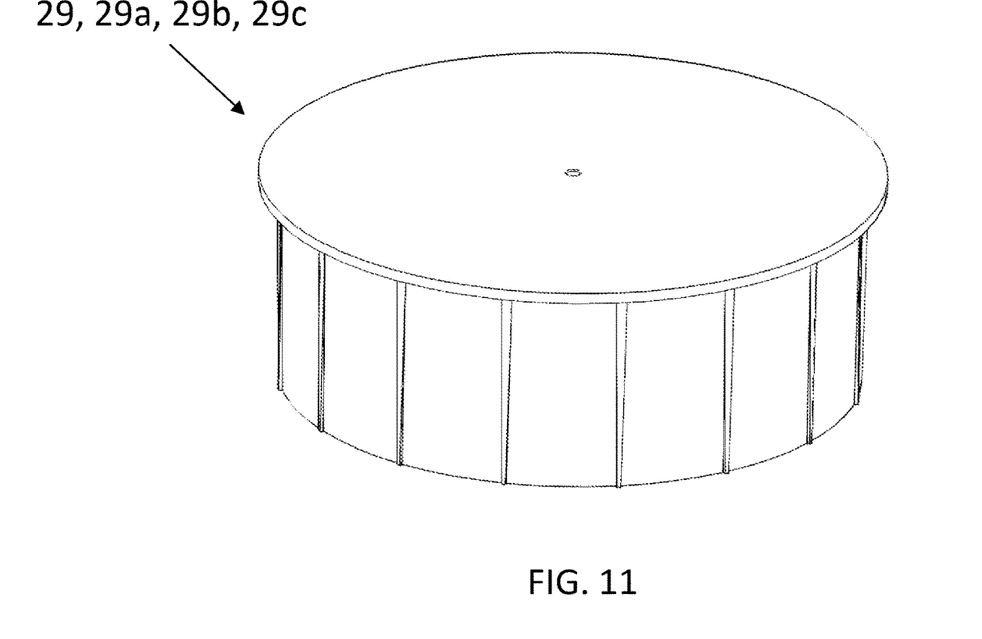
FIG. 11 is an isometric view of the cap for each tower of the present invention.
Figure 12:
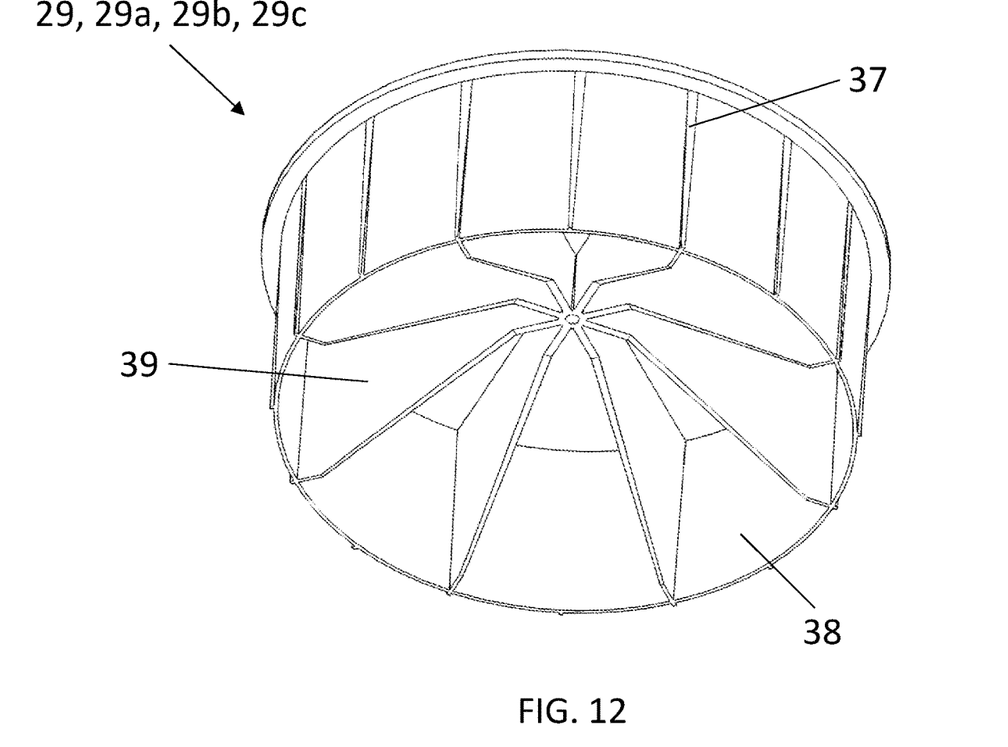
FIG. 12 is another isometric view of the structure of FIG. 11.

FIG. 11 is an isometric view of the cap 29 for each tower of the present invention and FIG. 12 is another isometric view of the cap from below. Each cap has a similar plurality of interference features 37 disposed about its rim 38. Similarly, these interference features are designed to abut and engage the inside surface of the tubes. A plurality of stiffening ribs 39 are designed to add strength and rigidity to the overall structure. Each cap can be injection molded as a single part.

Figure 8:
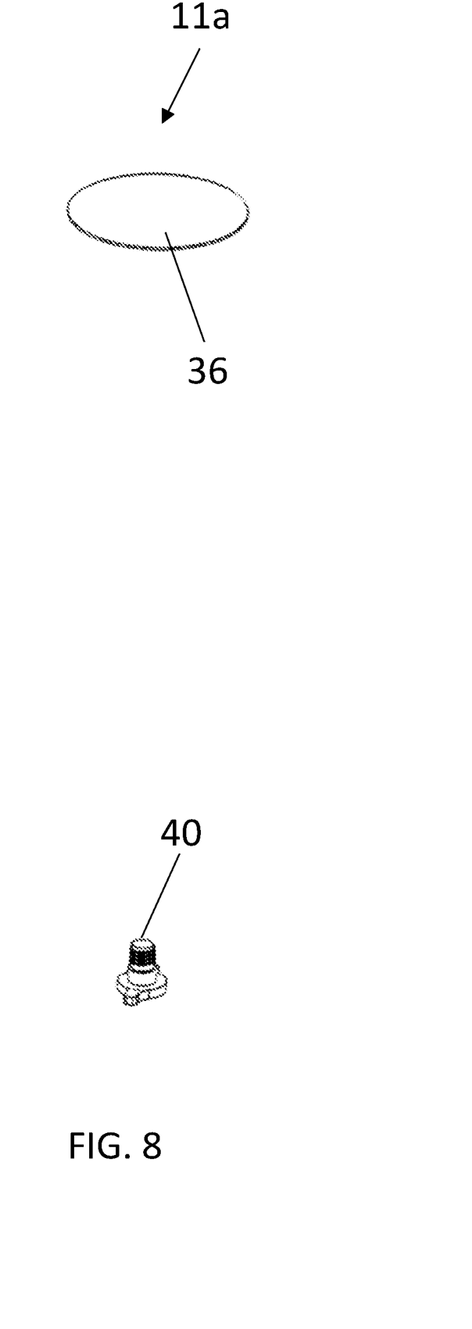
FIG. 8 is the same isometric view of the structure of FIG. 7 now with the cap and base removed showing the base connector and cap covering.

Referring back, FIG. 8 is the same isometric view of the structure of FIG. 7 now with the cap and base removed showing a base connector 40 and cap covering 36. The cap covering can be an adhesive backed carpet, or a part of a hook-and-loop fastener as previously discussed. Alternatively, the cap covering could be eliminated and leave just the plastic top of the cap as a support for the cat.

Figure 13:
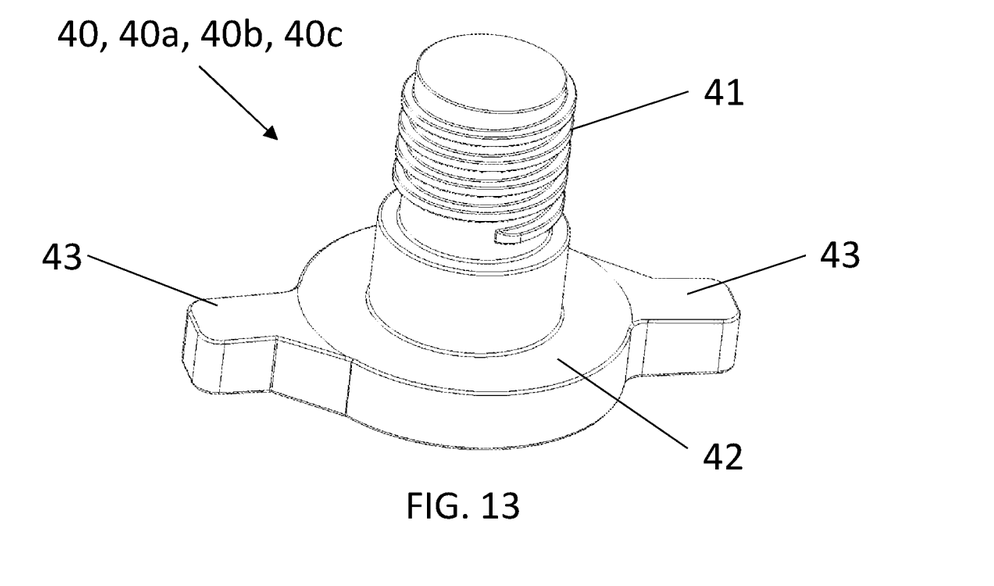
FIG. 13 is an isometric view of the base connector of the present invention.
Figure 14:
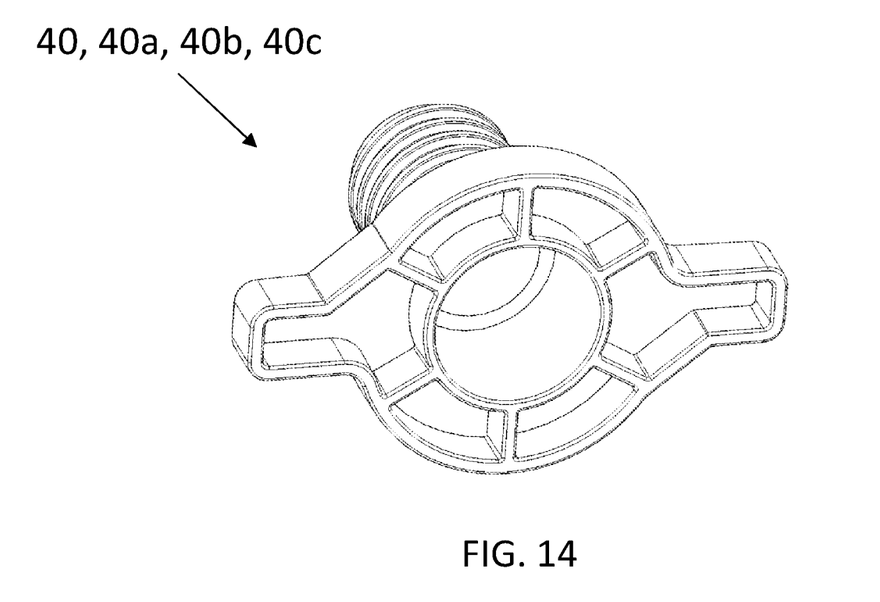
FIG. 14 is another isometric view of the structure of FIG. 13.

FIG. 13 is an isometric view of the base connector 40 and FIG. 14 is another isometric view of the base connector. It is understood that a first, a second and a third base connector 40a, 40b, 40c could be used respectively to attach to each cylindrical tower. Each base connector has a male side thread 41 connected to a flared end 42. The flared end may have at least one finger grip extension 43 extending outwardly. As shown, there are two finger grip extensions, but a plurality of finger grip extensions are possible. The base connector may be an injection molded plastic part.

Figure 15:
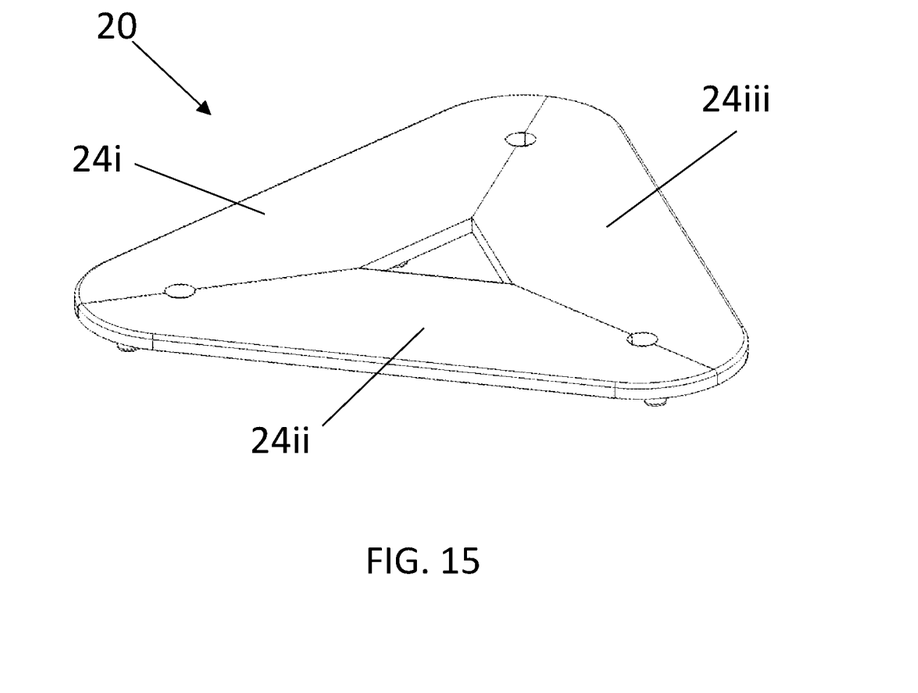
FIG. 15 is an isometric view of the flat triangular base of the present invention.
Figure 16:
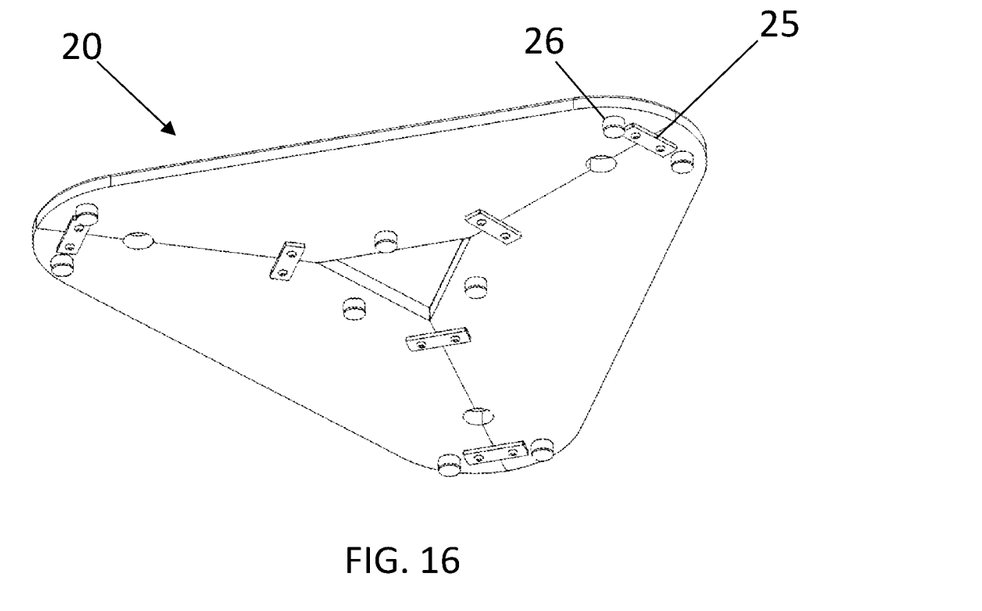
FIG. 16 is another isometric view of the structure of FIG. 15.
Figure 17:
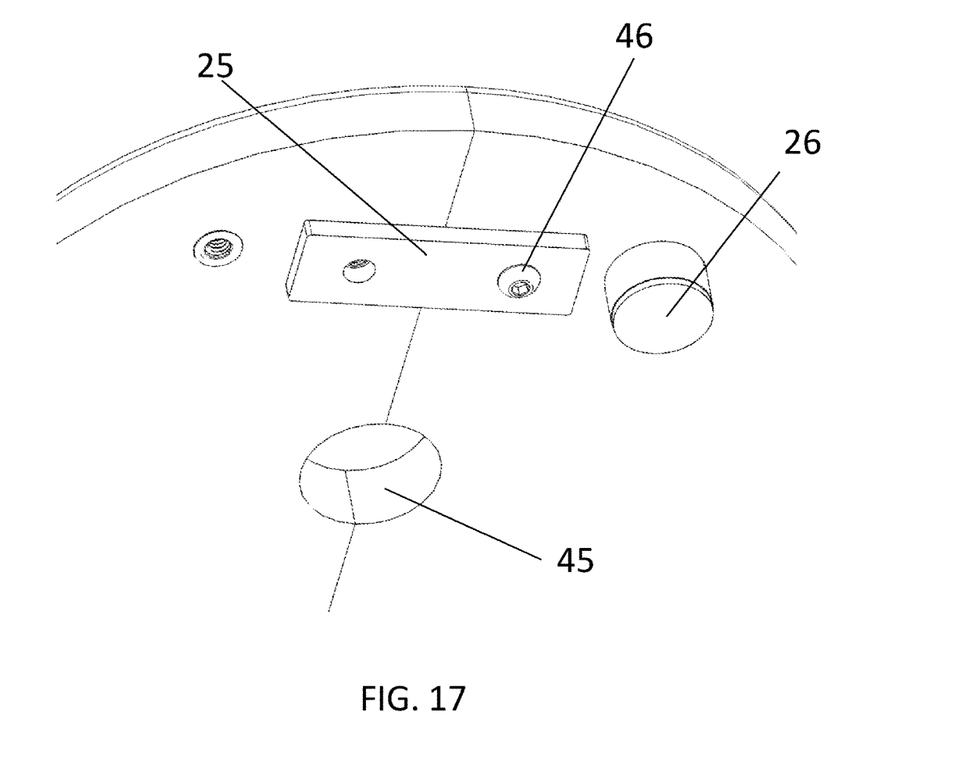
FIG. 17 is an enlarged isometric view of a portion of the flat triangular base of the present invention.
Figure 18:
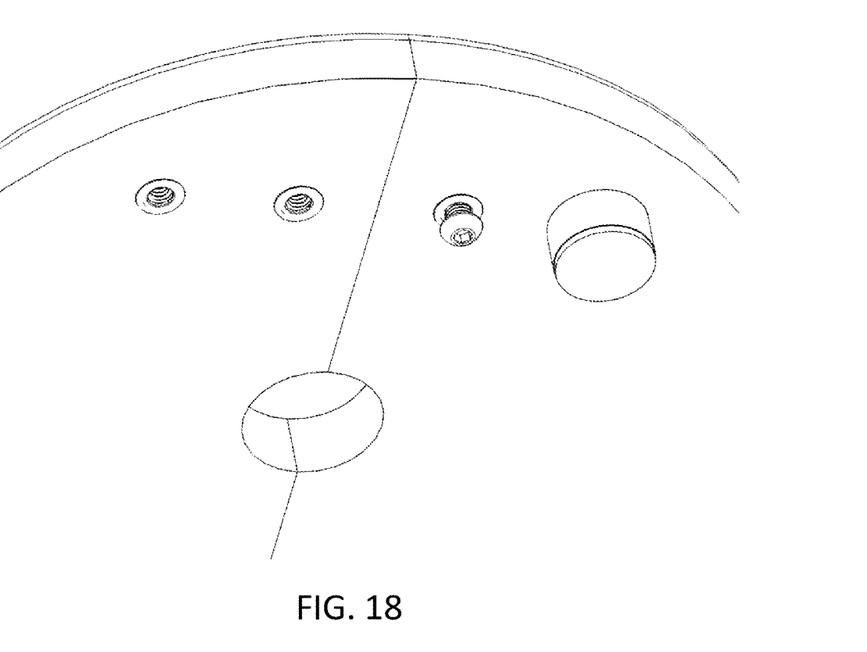
FIG. 18 is an isometric view similar to FIG. 17 now with the bracket and some fasteners removed.

FIG. 15 is an isometric view of the flat triangular base 20 of the present invention. FIG. 16 is another isometric view of the flat triangular base. FIG. 17 is an enlarged isometric view of a portion of the flat triangular base and FIG. 18 is an isometric view similar to FIG. 17 now with the bracket and some fasteners removed.

The flat triangular base may be composed of three identically shaped portions 24i, 24ii, 24iii which are attachable to one another. The three identically shaped portions are disposed adjacent to one another and are attachable to one another by a plurality of brackets 25 utilizing a plurality of fasteners 46. The three identically shaped portions are each shaped as an isosceles trapezoid, meaning two parallel sides (i.e., bases) and a line of symmetry about the legs. As shown here, the identically shaped portions are made from wood, but could also be injection molded plastic. The flat triangular base may include a plurality of leveling feet 26 attached to the bottom side of the flat triangular base.

The flat triangular base may comprise three holes 45 disposed therethrough that are configured to allow the male side thread of the base connector to pass therethrough from the bottom side of the flat triangular base. Each base may be attached to the top side of the flat triangular base by the flared end of the respective base connector disposed on the bottom side of the flat triangular base. A user is configured to manually rotate each base connector without the use of an auxiliary tool thereby securing the respective base of the cylindrical tower to the flat triangular base.

Figure 19:
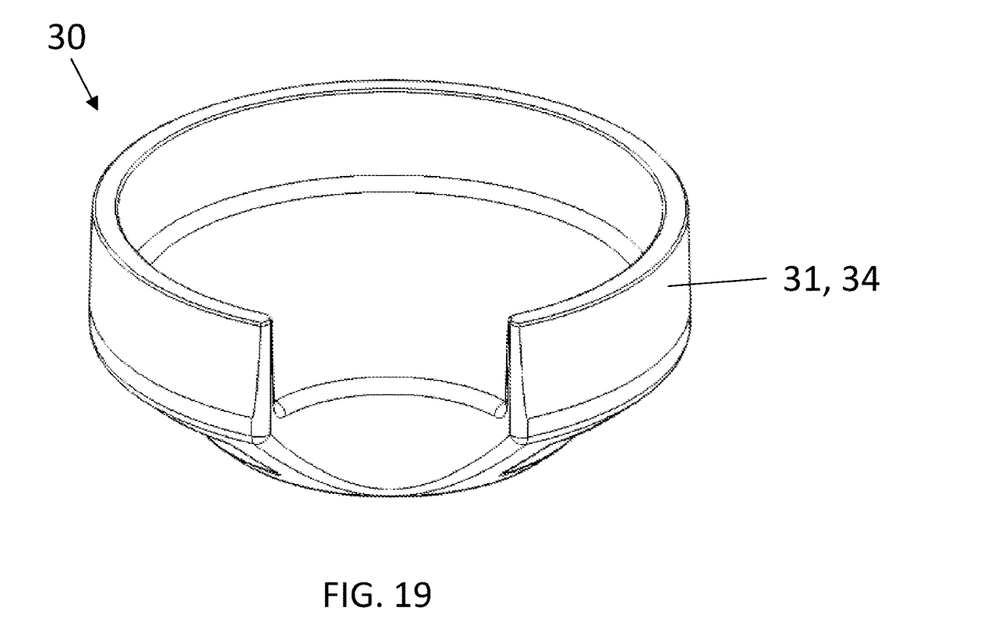
FIG. 19 is an isometric view of a resting pad from the structure of FIG. 1.
Figure 20:
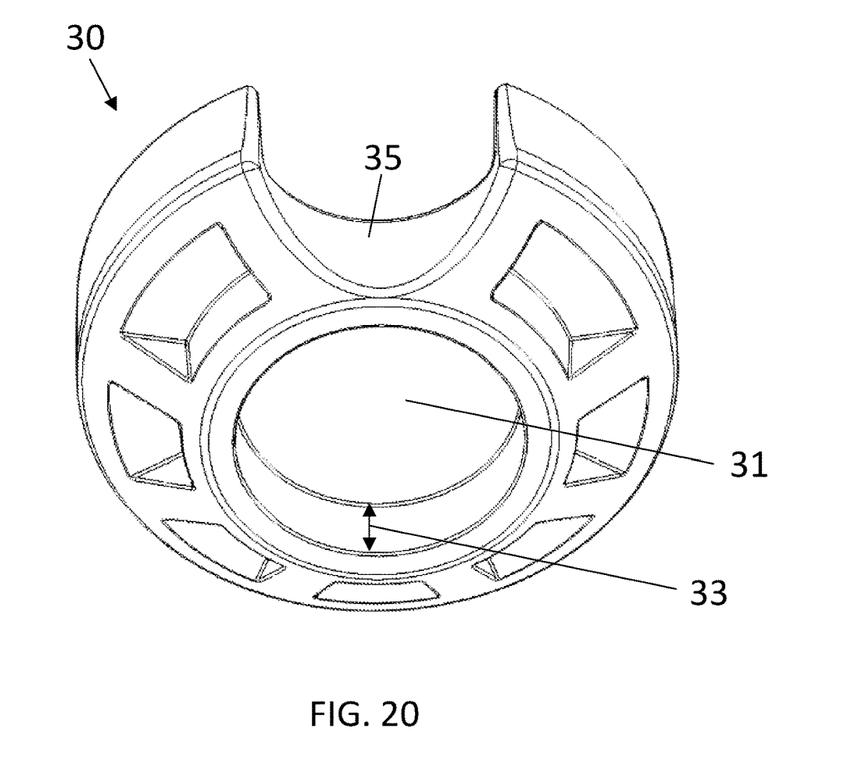
FIG. 20 is another isometric view of the structure of FIG. 19.

FIG. 19 is an isometric view of a resting pad 30 from the structure of FIG. 1 and FIG. 20 is another isometric view of the resting pad from below. The resting pad 30 is larger in diameter 31 in comparison to the first diameter and is configured to be removable attached to the first top end. The resting pad may have a large diameter blind hole 32 having a depth 33, where the blind hole is configured to snugly receive the first top end of the first cylindrical tower. The resting pad may include a raised upper rim 34 at least partially disposed around the diameter of the resting pad and a divot 35 that allows the cat access onto the resting pad. The resting pad could be made from an expanded foam. Alternatively, the resting pad could be made as an injection molded plastic part.

The cylindrical towers are connected to the flat triangular base solely by the base connectors, such that no structures are needed for additional support along the outer surface of the tubes. This creates a simple surface (i.e., rectangular surface then wrapped around a circle, cylindrical) for the sisal wraps to be attached around and simplifies the manufacturing and cost of the entire assembly.

Although several embodiments have been described in detail for purposes of illustration, various modifications may be made to each without departing from the scope and spirit of the invention. Accordingly, the invention is not to be limited, except as by the appended claims.

NUMERALS 10 structure
11 cylindrical tower
11a first cylindrical tower
11b second cylindrical tower
11c third cylindrical tower
12a first length, first cylindrical tower
12b second length, second cylindrical tower
12c third length, third cylindrical tower
13a first bottom end, first cylindrical tower
13b second bottom end, second cylindrical tower
13c third bottom end, third cylindrical tower
14a first top end, first cylindrical tower
14b second top end, second cylindrical tower
14c third top end, third cylindrical tower
15a first diameter, first cylindrical tower
15b second diameter, second cylindrical tower
15c third diameter, third cylindrical tower
16a first sisal wrap
16b second sisal wrap
16c third sisal wrap
17a first loop-and-hook fastener
17b second loop-and-hook fastener
17c third loop-and-hook fastener
18a first loop portion
18b second loop portion
18c third loop portion
19a first hook portion
19b second hook portion
19c third hook portion
20 flat triangular base
21 bottom side, flat triangular base
22 top side, flat triangular base
23a triangular end
23b triangular end
23c triangular end
24i identically shaped portion, flat triangular base
24ii identically shaped portion, flat triangular base
24iii identically shaped portion, flat triangular base
25 brackets
26 leveling feet
27 tube
27a first tube
27b second tube
27c third tube
28 base
28a first base
28b second base
28c third base
29 cap
29a first cap
29b second cap
29c third cap
30 resting pad
31 diameter, resting pad
32 blind hole, resting pad
33 depth, blind hole, resting pad
34 raised upper rim, resting pad
35 divot, resting pad
36 cap covering
37 interference features
38 rim
39 stiffening ribs
40 base connector
40a first connector
40b second connector
40c third connector
41 male side thread, connector
42 flared end, connector
43 finger grip extension, connector
44 female side thread, base, cylindrical tower
45 hole, flat triangular base
46 fastener

What is claimed is:

1. A self-supporting structure for the play and relaxation of cats, the structure comprising:
a first cylindrical tower defining a first length from a first bottom end opposite a first top end, the first cylindrical tower having a first diameter;
a second cylindrical tower defining a second length from a second bottom end opposite a second top end, the second cylindrical tower having a second diameter;
a third cylindrical tower defining a third length from a third bottom end opposite a third top end, the third cylindrical tower having a third diameter;
a flat triangular base defining a bottom side opposite a top side, wherein the bottom side is configured to face downwards and the top side is configured to face upwards;
wherein the flat triangular base is configured to be attachable at each of its triangular ends respectively to the first bottom end, the second bottom end and the third bottom end of the cylindrical towers;
wherein the second diameter and the third diameter are each less than the first diameter;
wherein the second length added to the third length is less than the first length; and
wherein the second cylindrical tower and the third cylindrical tower are configured to be disposed inside the first cylindrical tower during shipping.

2. The structure of claim 1, wherein each cylindrical tower comprises a tube with a base connected to the bottom end of the tube and a cap connected to the top end of the tube.

3. The structure of claim 2, wherein each base is connected to the bottom end of the tube with a bottom interference fit, and wherein each cap is connected to the top end of the tube with a top interference fit.

4. The structure of claim 2, wherein the first base is connected to the first bottom end of the first tube with a first bottom interference fit, wherein the first cap is connected to the first top end of the first tube with a first top interference fit, wherein the second base is connected to the second bottom end of the second tube with a second bottom interference fit, wherein the second cap is connected to the second top end of the second tube with a second top interference fit, wherein the third base is connected to the third bottom end of the third tube with a third bottom interference fit, and wherein the third cap is connected to the third top end of the third tube with a third top interference fit.

5. The structure of claim 1, wherein the first cylindrical tower comprises a first tube with a first base connected to the first bottom end of the first tube and a first cap connected to the first top end of the first tube, wherein the second cylindrical tower comprises a second tube with a second base connected to the second bottom end of the second tube and a second cap connected to the second top end of the second tube, and wherein the third cylindrical tower comprises a third tube with a third base connected to the third bottom end of the third tube and a third cap connected to the third top end of the third tube.

6. The structure of claim 1, wherein the second length is less than the third length.

7. The structure of claim 1, wherein the second length is equal to the third length.

8. The structure of claim 1, wherein the flat triangular base is composed of three identically shaped portions attachable to one another.

9. The structure of claim 8, wherein the three identically shaped portions are disposed adjacent to one another and are attachable to one another by a plurality of brackets.

10. The structure of claim 8, wherein the three identically shaped portions are each shaped as an isosceles trapezoid.

11. The structure of claim 1, including a plurality of leveling feet attached to the bottom side of the flat triangular base.

12. The structure of claim 1, including a first sisal wrap having a first loop-and-hook fastener at its ends, a first loop portion at one end and a first hook portion at the other end, wherein the first sisal wrap is configured to wrap around the first diameter and attach to itself using the first hook-and-loop fastener.

13. The structure of claim 12, including a second sisal wrap having a second loop-and-hook fastener at its ends, a second loop portion at one end and a second hook portion at the other end, wherein the second sisal wrap is configured to wrap around the second diameter and attach to itself using the second hook-and-loop fastener.

14. The structure of claim 13, including a third sisal wrap having a third loop-and-hook fastener at its ends, a third loop portion at one end and a third hook portion at the other end, wherein the third sisal wrap is configured to wrap around the third diameter and attach to itself using the third hook-and-loop fastener.

15. The structure of claim 1, including a resting pad larger in diameter in comparison to the first diameter and configured to be removable attached to the first top end.

16. The structure of claim 15, wherein the resting pad comprises a large diameter blind hole having a depth, where the blind hole is configured to snugly receive the first top end of the first cylindrical tower.

17. The structure of claim 15, wherein the resting pad comprises a raised upper rim at least partially disposed around the diameter of the resting pad.

18. The structure of claim 15, wherein the resting pad comprises a foam material.

19. The structure of claim 1, including a first, a second and a third base connector, each base connector having a male side thread connected to a flared end, the flared end having at least one finger grip extension extending outwardly, wherein each base connector is an injection molded plastic part.

20. The structure of claim 19, wherein each base comprises a female side thread configured to accept the male side thread of the base connector.

21. The structure of claim 20, wherein the flat triangular base comprises three holes disposed therethrough configured to allow the male side thread of the base connector to pass therethrough from the bottom side of the flat triangular base, wherein each base is attached to the top side of the flat triangular base by the flared end of the respective base connector disposed on the bottom side of the flat triangular base, wherein a user is configured to manually rotate each base connector without the use of a auxiliary tool thereby securing the respective base of the cylindrical tower to the flat triangular base.

22. The structure of claim 1, wherein the first, second and third cylindrical towers are hollow.

23. The structure of claim 1, wherein the third diameter is less than the second diameter, the third length is less than the second length, and wherein the third cylindrical tower is configured to be disposed inside of the second cylindrical tower during shipping.

\* \* \* \* \*